UNITED STATES PATENT OFFICE.

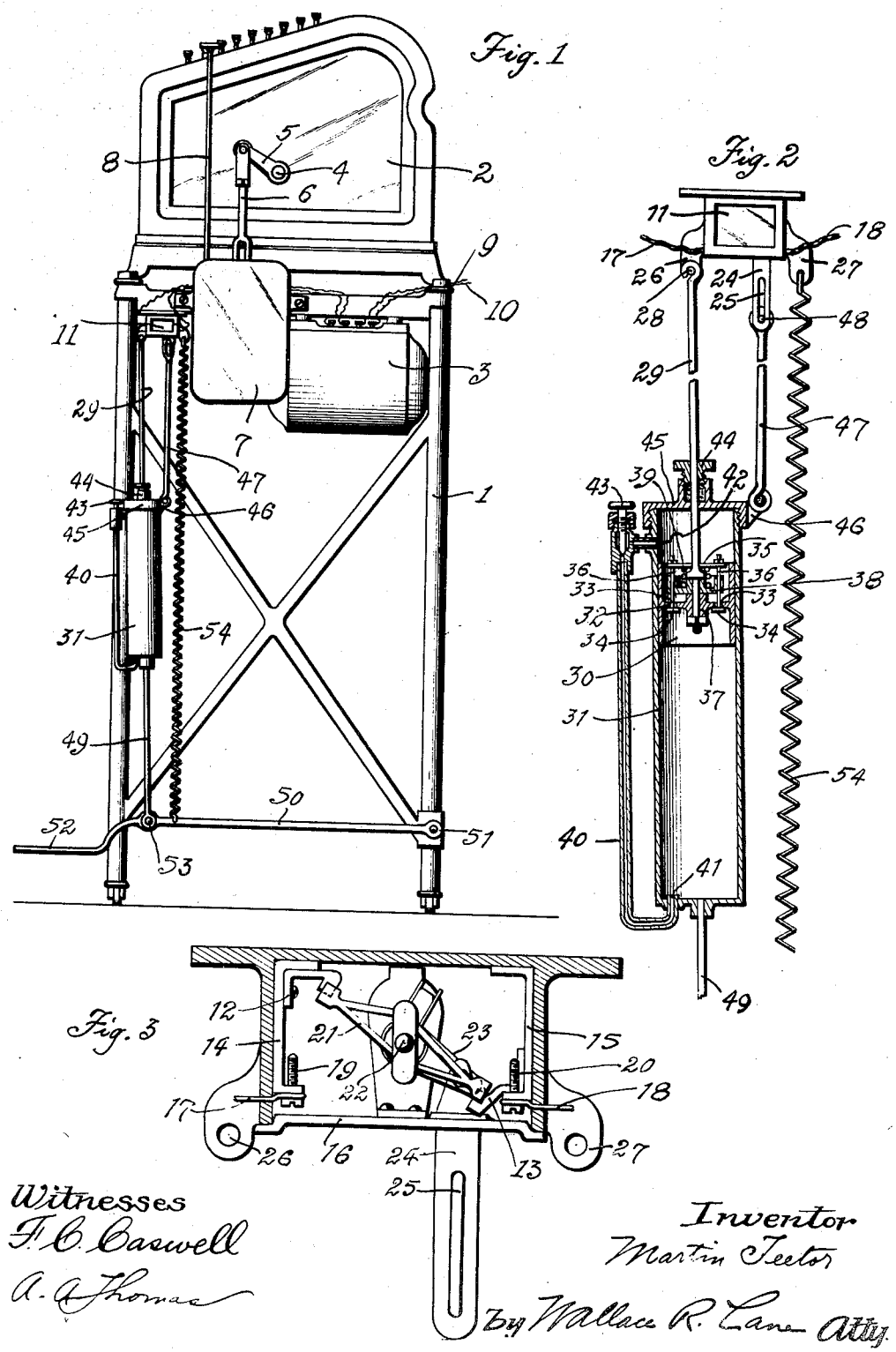

MARTIN TEETOR, OF DES MOINES, IOWA, ASSIGNOR TO TEETOR COMPANY, OF DES MOINES, IOWA, A CORPORATION OF IOWA.

ATTACHMENT FOR CALCULATING-MACHINES.

1,167,132.  Specification of Letters Patent.  Patented Jan. 4, 1916.

Application filed March 3, 1911. Serial No. 612,131.

*To all whom it may concern:*

Be it known that I, MARTIN TEETOR, a citizen of the United States, residing at Des Moines, county of Polk, and State of Iowa, have invented a new and useful Attachment for Calculating-Machines, of which the following is a specification.

My invention relates to calculating machines arranged to be driven by an electric motor, and has for its object the provision of novel mechanism for controlling the motor switch by means of a treadle.

As a further feature of improvement this mechanism includes a retarding device, so constructed that when the operator releases the treadle to open the motor switch, the opening of the switch does not take place immediately, but is delayed for a brief interval of time. The purpose of this retarding device is to permit the operator to leave the machine for a limited interval of time without the necessity of stopping the motor. In motor driven calculating machines heretofore constructed, the motor switch was controlled by hand and the operation of the switch was direct and immediate upon actuation of the switch handle or switch button. The control of the motor switch by means of a treadle gives the operator the freedom of both of his hands for the operation of the keyboard. The retarded or delayed operation of the switch upon release of the treadle permits the operator to leave the machine for a limited period of time without having to manipulate some form of stopping device for the motor. The retarding mechanism herein disclosed is also provided with means for regulating the amount of retardation in the operation of the motor switch.

In the accompanying drawings which illustrate a preferred form of my invention, Figure 1 represents a side elevation of a motor-driven calculating machine provided with my new attachment, Fig. 2 is a cross-sectional view of the retarding mechanism together with some of the associated connections, and Fig. 3 is an internal view of a suitable form of switch adapted to be connected with retarding mechanism.

On a suitable support or standard, indicated as a whole by the reference numeral 1, is mounted a calculating machine 2 of any approved form or construction. Inasmuch as this calculating machine does not in and of itself form any part of my invention, but may be of a form well known in the art, it is unnecessary here to give any detailed description thereof, since the construction and operation of such a machine is well understood by those skilled in the art. The support 1 carries an electric motor 3 which is arranged to be operatively connected with the power shaft 4 of the adding machine. For the sake of illustration I have in Fig. 1 shown an arm 5 connected to the power shaft 4 and a slotted link 6 depending from the free end of the arm 5. The connections between the motor shaft and the slotted link 6 are of any approved and well known form and are understood to be arranged within the box or casing 7 secured to the support 1.

The adding machine is also provided with a starting key 8 which is adapted to control a suitable clutch between the motor shaft and the slotted link 6, this clutch being arranged in the box or casing 7. Since the operative connections between the power shaft 4, the starting key 8 and the motor 3 do not in and of themselves form any part of my invention, I have not thought it necessary to show or describe in detail the mechanism contained within the box or casing 7, since such mechanism is well understood by those skilled in the art. The supply conductors 9 and 10 lead from a suitable source of electric energy to the motor windings. The support or standard 1 has fixed thereto a suitable form of electric switch 11. In the illustrations shown in the drawing, the motor switch 11 is depicted as what is known in the art as a flush-wall switch. Fig. 3 shows the operative parts of such a switch. The terminals 12 and 13 are secured to the metallic strips 14 and 15, respectively. Into the casing 16 extend the conductors 17 and 18. A binding post 19 secures the conductor 17 in electrical contact with the metal strip 14, and a binding post 20 holds the conductor 18 in electrical contact with the other metal strip 15. A metallic arm 21 pivoted at 22 is adapted to electrically connect the terminals 12 and 13, thereby closing the circuit through the motor windings. Rigidly connected to the metallic arm 21 is a lever 23 to which is pivoted the upper end of the link 24 provided with a slot 25. The switch casing 16 is provided with a pair of perforated lugs 26 and 27. The lug 26 is provided with a pin 28 on which is pivoted the rod 29. To the lower end of this rod is rigidly secured the piston 30 which is arranged to operate within the cylinder 31. The piston 30 is in the form of a cylinder having a disk portion 32 provided with one or more valve openings 33. These openings are adapted to be normally closed by valves 34. The piston rod 29 carries a disk 35 which engages the upper ends of the valve stems 36. On the hub portion 37 of the piston disk 32 rests a cup-shaped disk 38 provided with openings for accommodating the valve stems 36. A coil spring 39 bearing at one end against the cup-shaped disk 38 and at the other end against the disk 35, normally holds the valves 34 firmly against their respective openings. The cylinder 31 is provided with a by-pass 40 which at one end communicates with the cylinder at the point 41 and at the other end at the point 42, these points of communication being at opposite sides of the piston 30. A needle valve 43 is arranged in the by-pass 40 for controlling the flow of oil or other suitable fluid with which the cylinder is filled. The cylinder is provided with a suitable stuffing box or gland 44 to render the connection between the cylinder and the piston rod airtight. The top of the cylinder is preferably closed by a cap 45 which may be screwed on to the cylinder. The cap 45 is provided with a pivot lug 46 to which is connected one end of a rod 47. The upper end of this link is provided with a pin 48 which is adapted to work in the slot 25 of the link 24. At its lower end the cylinder 31 has secured thereto the rod 49. A treadle 50 is at its rear end pivoted to the support 1 at 51 and at its front end terminates in a foot piece 52. The rod 49 is pivoted to the treadle 50 at 53. A spring 54 is at one end connected to the lug 27 of the switch box 16 and at the other end to the treadle 50, so as to normally hold the treadle in the position shown in Fig. 1.

From the above detailed description it will be apparent that when the operator depresses the treadle, the cylinder 31 is drawn down while the piston 30 remains stationary. This causes such a pressure of the oil or fluid in the cylinder on the disk 35 that the latter is depressed sufficiently against the action of the spring 39 to open the ports 33. This forces the oil or fluid through these ports and thereby permits ready movement of the cylinder relative to the piston. The downward movement of the piston 31 is accompanied by the downward movement of the link 24, whereby the motor switch is closed, as shown in Fig. 3. It is of course to be understood that the motor switch is normally open and that it is not in the closed position until the link 24 is drawn down by the cylinder 31. The switch remains closed as long as the operator keeps his foot on the treadle. Should the treadle be released, the spring 54 will draw the same upwardly and simultaneously move the cylinder 31 upwardly. During this upward movement of the cylinder the valves 34 remain closed and the oil in the cylinder is forced through the by-pass 40 from one side of the piston to the other. This circulation of the oil is comparatively slow because of the restricted area of the by-pass. It will, therefore, take a corresponding amount of time for the cylinder to rise to its normal position. The motor switch remains closed until the cylinder reaches the limit of its upward movement, whereupon the pin 48 forces the link 24 upwardly to open the switch. Should the operator depress the treadle before the cylinder has reached the limit of its upper movement, the motor circuit remains closed and he may continue the operation of the calculating machine without having to attend to any switch connections. The flow of oil or fluid through the by-pass 40 is regulated by the needle valve 43, but it is obvious that other means may be provided for regulating the rapidity of circulation of the oil. It is obvious that the length of time which it takes the cylinder to travel from its lower to its upper position depends upon the rate of flow of the oil through the by-pass 40. Therefore by regulating the effective area of the by-pass the amount of retardation in the operation of the motor switch may be accordingly regulated.

It should be understood that the particular form of switch which has been selected for illustration in the drawings for the sake of clearness, does not in and of itself form any part of my present invention and that any suitable form of circuit-controlling switch may be used.

I would also have it understood that while I have herein shown one specific embodiment of my invention, various changes and modifications may be resorted to without departing from the scope of the invention as defined in the appended claims. For instance, my new form of switch-operating mechanism is readily adapted for use in connection with various kinds of motor-driven appliances which are necessarily used intermittently and where the motor is instantly cut into circuit, but is cut out of circuit with retarded action of the controlling switch.

Having thus described my invention what I claim as new and desire to secure by Letters Patent of the United States is:

1. The combination of a machine, an electric motor for operating the same, a switch in the motor circuit, a treadle, a fluid-filled cylinder connected at one end to said treadle and at the other end to said switch, a stationarily supported piston within said cylinder, one or more normally closed valves carried by said piston and arranged to open automatically when the cylinder is moved down by the operation of the treadle, and a by-pass connected to said cylinder at opposite sides of the piston.

2. The combination of a suitable support, a machine mounted thereon, an electric motor for operating said machine, a switch secured to said support for controlling the motor circuit, a treadle pivoted to said support, a fluid-filled cylinder connected at its lower end to said treadle, a lost-motion connection between said switch and said cylinder, a piston within said cylinder, a rod secured at one end to said piston and pivoted at its other end to said support, one or more normally closed valves carried by said piston and arranged to open automatically when the cylinder is moved down by the operation of the treadle, and a by-pass connected to said cylinder at opposite sides of the piston.

3. The combination of a suitable support, a driven machine mounted thereon, an electric motor for operating said machine, a switch secured to said support for controlling the motor circuit, a treadle pivoted to said support, a fluid-filled cylinder connected at its lower end to said treadle, a lost-motion connection between said switch and said cylinder, a piston within said cylinder, a rod secured at one end to said piston and pivoted at its other end to said support, one or more normally closed valves carried by said piston and arranged to open automatically when the cylinder is moved down by the operation of the treadle, a by-pass connected to said cylinder at opposite sides of the piston, and means for regulating the flow of fluid through said by-pass.

4. The combination of a suitable appliance, an electric motor for operating the same, a switch in the motor circuit, a treadle, operative connections between said treadle and said switch for controlling the latter, a retarding device included in said connections for retarding the operation of the switch when the treadle is released, and means for regulating the amount of retardation of said device.

5. The combination of a suitable support, a driven machine mounted thereon, an electric motor for operating said driven machine, a switch secured to said support for controlling the motor circuit, a treadle pivoted to said support and having connections with said switch for controlling the same, said connections including a device for retarding the operation of the switch when the treadle is released, a spring for normally holding the treadle in inoperative position, and means for regulating the amount of retardation of said device.

6. The combination of a suitable appliance, an electric motor for operating the same, a switch in the motor circuit, a treadle, a fluid-filled cylinder provided with a piston, a by-pass connected to said cylinder at opposite sides of said piston, one or more normally closed valves carried by said piston and arranged to open automatically under pressure of fluid in one direction, said cylinder and piston being movable relatively to each other, and operative connections whereby the depression of said treadle opens the switch and moves the piston relatively to the cylinder, the piston valves being open during this movement, while release of the treadle causes relative movement of piston and cylinder in the opposite direction, the piston valves being closed during this return movement and the fluid being forced through the by-pass.

7. The combination of an electric motor, a switch in the motor circuit, and mechanism for operating said switch, said mechanism operating instantly to close the switch and operating with retarded action to open the switch.

In witness whereof, I hereunto subscribe my name this 9th day of December, A. D. 1910.

MARTIN TEETOR.

Witnesses:
 CLARENCE J. LOFTUS,
 ELIZABETH SKAHILL.